United States Patent
Qiu (10) Patent No.: US 10,986,488 B2
(45) Date of Patent: Apr. 20, 2021

(54) METHOD AND DEVICE FOR SENDING CAPABILITY INFORMATION OF COMMUNICATIONS DEVICE

(71) Applicant: HUAWEI TECHNOLOGIES CO., LTD., Guangdong (CN)

(72) Inventor: Jing Qiu, Chengdu (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/503,585

(22) Filed: Jul. 4, 2019

(65) Prior Publication Data
US 2019/0327606 A1    Oct. 24, 2019

Related U.S. Application Data

(63) Continuation of application No. PCT/CN2018/071780, filed on Jan. 8, 2018.

(30) Foreign Application Priority Data

Jan. 6, 2017  (CN) .......................... 201710011418.6

(51) Int. Cl.
*H04W 4/00* (2018.01)
*H04W 8/22* (2009.01)
*H04W 24/04* (2009.01)

(52) U.S. Cl.
CPC ............. *H04W 8/22* (2013.01); *H04W 24/04* (2013.01)

(58) Field of Classification Search
CPC ...... H04B 7/0628; H04W 8/22; H04W 24/04; H04W 28/18; H04W 28/20; H04W 28/22;
(Continued)

(56) References Cited

U.S. PATENT DOCUMENTS

| 8,606,257 B2* | 12/2013 | Li ........................... H04W 8/22 455/422.1 |
| 9,237,440 B2* | 1/2016 | Geirhofer ............... H04W 8/22 |

(Continued)

FOREIGN PATENT DOCUMENTS

| CN | 101626598 A | 1/2010 |
| CN | 101164351 B | 4/2011 |

(Continued)

OTHER PUBLICATIONS

Zhang et al, Filtered-OFDM—Enabler for Flexible Waveform in The 5th Generation Cellular Networks, IEEE, 6 pages, 2015.*

(Continued)

*Primary Examiner* — Frank Duong
(74) *Attorney, Agent, or Firm* — Womble Bond Dickinson (US) LLP (57) ABSTRACT

A method and device for sending capability information of a communications device are disclosed. The method includes: determining, by a communications device, information about maximum data transmission bandwidth supported by the communications device; and sending, by the communications device, the information about the maximum data transmission bandwidth supported by the communications device. In the embodiments of the present disclosure, the communications device determines the information about the maximum data transmission bandwidth supported by the communications device and sends the information about the maximum data transmission bandwidth supported by the communications device, so that communications devices supporting different maximum data transmission bandwidth can coexist in a communications system, to implement communication between communications devices supporting different maximum data transmission bandwidth.

20 Claims, 6 Drawing Sheets

---

301. A communications device determines information about maximum data transmission bandwidth supported by the communications device 302. The communications device sends the information about the maximum data transmission bandwidth supported by the communications device (58) Field of Classification Search
CPC . H04W 72/0406; H04W 76/15; H04W 80/02; H04W 84/20
See application file for complete search history.

(56) References Cited

U.S. PATENT DOCUMENTS

| | | | |
|---|---|---|---|
| 10,405,175 B2* | 9/2019 | Henttonen | H04W 8/245 |
| 10,588,130 B2* | 3/2020 | Raghunathan | H04W 8/22 |
| 2007/0104151 A1 | 5/2007 | Papasakellariou et al. | |
| 2013/0128816 A1 | 5/2013 | Li et al. | |
| 2013/0142139 A1 | 6/2013 | Kitazoe et al. | |
| 2013/0195002 A1* | 8/2013 | Walker | H04L 5/005 370/312 |
| 2013/0322370 A1* | 12/2013 | Fong | H04W 8/20 370/329 |
| 2015/0009939 A1 | 1/2015 | Zhang et al. | |
| 2015/0358131 A1 | 12/2015 | Siomina et al. | |
| 2016/0157228 A1* | 6/2016 | Yum | H04L 5/0007 370/329 |
| 2016/0269212 A1* | 9/2016 | Vilaipornsawai | H04L 27/2627 |
| 2016/0352551 A1* | 12/2016 | Zhang | H04L 27/2646 |
| 2018/0084539 A1* | 3/2018 | Kubota | H04W 76/15 |
| 2018/0092085 A1* | 3/2018 | Shaheen | H04W 72/048 |
| 2018/0139773 A1* | 5/2018 | Ma | H04L 5/0037 |

FOREIGN PATENT DOCUMENTS

| | | |
|---|---|---|
| CN | 102232312 A | 11/2011 |
| CN | 103327615 A | 9/2013 |
| CN | 104054297 A | 9/2014 |
| CN | 105027624 B | 6/2019 |
| EP | 2822339 A1 | 1/2015 |
| WO | 2009116562 A1 | 9/2009 |

OTHER PUBLICATIONS

Zhang et al, On the Waveform for 5G, IEEE, 7 pages, 2016.*
3GPP TR 38.802 V1.0.0 (Nov. 2016);3rd Generation Partnership Project;Technical Specification Group Radio Access Network;Study on New Radio (NR) Access TechnologyPhysical Layer Aspects(Release 14);total 65 pages.
China Unicorn (Rapporteur) et al.,"TP on LTE impacts for HSPA and LTE joint operation",3GPP TSG-RAN WG2 #96 R2-168992,Reno, Nevada, USA, Nov. 14-18, 2016,total 25 pages.
Huawei et al.,"Consideration on NR waveform and spectrum utilization",3GPP TSG RAN WG4 Meeting #NR R4-1700134,Spokane, USA, Jan. 17-19, 2017,total 4 pages.
Huawei et al.,"Further discussion on spectrum utilization",3GPP TSG RAN WG4 Meeting #81 R4-1609411,Reno, USA, Nov. 14-18, 2016,total 14 pages.
Samsung,"Initial considerations on spectral utilization on NR system with several spectral confinement techniques",3GPP TSG-RAN WG4 Meeting #81 R4-1609357,Reno, NV, USA, Nov. 14-18, 2016,total 6 pages.
Zte et al.,"Considerations on NR spectrum utilization and usage of fractional RB",3GPP TSG-RAN WG4 Meeting#81 R4-1609662,Reno, Nevada, USA, Nov. 14-18, 2016,total 8 pages.

* cited by examiner

METHOD AND DEVICE FOR SENDING CAPABILITY INFORMATION OF COMMUNICATIONS DEVICE

CROSS-REFERENCE TO RELATED APPLICATIONS

This application is a continuation of International Application No. PCT/CN2018/071780, filed on Jan. 8, 2018, which claims priority to Chinese Patent Application No. 201710011418.6, filed on Jan. 6, 2017. The disclosures of the aforementioned applications are hereby incorporated by reference in their entireties.

TECHNICAL FIELD

The present disclosure relates to communications technologies, and in particular, to a method and device for sending capability information of a communications device.

BACKGROUND

In a new radio (NR) technology, different subbands in a same carrier can support different physical layer parameters. Spectrum localization waveform technologies may be used for different subbands to isolate interference between the subbands. A physical layer parameter set of subbands may be referred to as numerology. A physical layer parameter of a subband may include at least one of parameters such as a subcarrier spacing, a cyclic prefix (CP) length, a transmission time interval (TTI) length, a symbol length, and a quantity of symbols. The spectrum localization waveform technologies may include a filtered-orthogonal frequency division multiplexing (f-ofdm) technology and a windowed-orthogonal frequency division multiplexing (w-ofdm) technology.

A communications device needs to have different capabilities to support different physical layer parameters or different waveform technologies. The communications device may include a terminal device and a network device. If a peer end communicates with the communications device by using a capability that does not match that of the communications device, poor communication quality or a communication failure is caused.

SUMMARY

In view of the above, it is necessary to provide a method for sending capability information of a communications device, to implement communication between communications devices.

According to a first aspect, an embodiment of the present disclosure provides a method for sending capability information of a communications device, including:

determining, by a communications device, information about maximum data transmission bandwidth supported by the communications device; and sending, by the communications device, the information about the maximum data transmission bandwidth supported by the communications device.

In a possible implementation, if maximum transmit data transmission bandwidth supported by the communications device is the same as maximum receive data transmission bandwidth supported by the communications device, the sending, by the communications device, the information about the maximum data transmission bandwidth supported by the communications device includes: sending, by the communications device, information about the maximum transmit data transmission bandwidth supported by the communications device or information about the maximum receive data transmission bandwidth supported by the communications device.

In one embodiment, the method further includes: determining, by the communications device, information about a waveform supported by the communications device or information about a physical layer parameter supported by the communications device; and sending, by the communications device, the information about the waveform supported by the communications device or the information about the physical layer parameter supported by the communications device.

In a possible implementation, if the communications device includes a terminal device, the sending, by the communications device, the information about the maximum data transmission bandwidth supported by the communications device includes: sending, by the terminal device, information about maximum data transmission bandwidth supported by the terminal device to a network device; and the method further includes: receiving, by the terminal device, scheduling information sent by the network device, where the scheduling information is determined by the network device based on the information about the maximum data transmission bandwidth supported by the terminal device.

In another possible implementation, if the communications device includes a network device, the sending, by the communications device, the information about the maximum data transmission bandwidth supported by the communications device includes: broadcasting, by the network device, information about maximum data transmission bandwidth supported by the network device.

According to a second aspect, an embodiment of the present disclosure provides a communications device, including:

a processing unit, configured to determine information about maximum data transmission bandwidth supported by the communications device; and a transceiver unit, configured to send the information about the maximum data transmission bandwidth supported by the communications device.

In a possible implementation, if maximum transmit data transmission bandwidth supported by the communications device is the same as maximum receive data transmission bandwidth supported by the communications device, the transceiver unit is configured to send information about the maximum transmit data transmission bandwidth supported by the communications device or information about the maximum receive data transmission bandwidth supported by the communications device.

In one embodiment, the processing unit is further configured to determine information about a waveform supported by the communications device or information about a physical layer parameter supported by the communications device; and the transceiver unit is further configured to send the information about the waveform supported by the communications device or the information about the physical layer parameter supported by the communications device.

In a possible implementation, if the communications device is a terminal device, the transceiver unit is configured to send information about maximum data transmission bandwidth supported by the terminal device to a network device; and the transceiver unit is further configured to receive scheduling information sent by the network device, where the scheduling information is determined by the network device based on the information about the maximum data transmission bandwidth supported by the terminal device.

In another possible implementation, if the communications device is a network device, the transceiver unit is configured to broadcast information about maximum data transmission bandwidth supported by the network device.

According to a third aspect, an embodiment of the present disclosure provides another communications device, including:

a transceiver 702, a processor 701, and a memory 703.

The processor 701 reads a program in the memory 703 to control the transceiver 702, and the following process is performed: determining, by the processor 701, information about maximum data transmission bandwidth supported by the communications device; and sending, by the transceiver 702, the information about the maximum data transmission bandwidth supported by the communications device.

The processor 701 reads the program in the memory 703 to control the transceiver 702. For details about the executed processing, refer to related description of the processing unit and the transceiver unit in the communications device in the second aspect. Details are not described herein again.

According to a fourth aspect, an embodiment of the present disclosure provides a computer readable storage medium, where the computer readable storage medium stores an instruction, and when the instruction is run on a computer, the computer performs the method described in the foregoing aspects.

The information about the maximum data transmission bandwidth supported by the communications device in the foregoing aspects includes at least one of the following information:

information about a maximum data transmission bandwidth value supported by the communications device;

information about a maximum spectrum utilization rate supported by the communications device, where the information about the maximum spectrum utilization rate supported by the communications device is a ratio of the maximum data transmission bandwidth supported by the communications device to carrier bandwidth;

information about a quantity of resource blocks corresponding to the maximum data transmission bandwidth supported by the communications device;

information about a physical layer parameter used by the communications device, where there is a correspondence between the information about the physical layer parameter used by the communications device and the information about the maximum data transmission bandwidth value supported by the communications device, or there is a correspondence between the information about the physical layer parameter used by the communications device and the information about the maximum spectrum utilization rate supported by the communications device, or there is a correspondence between the information about the physical layer parameter used by the communications device and the information about the quantity of RBs corresponding to the maximum data transmission bandwidth supported by the communications device; or type information of the communications device, where there is a correspondence between the type information of the communications device and the information about the maximum data transmission bandwidth value supported by the communications device, or there is a correspondence between the type information of the communications device and the information about the maximum spectrum utilization rate supported by the communications device, or there is a correspondence between the type information of the communications device and the information about the quantity of resource blocks corresponding to the maximum data transmission bandwidth supported by the communications device.

In one embodiment, the information about the maximum data transmission bandwidth supported by the communications device includes: information about maximum transmit data transmission bandwidth supported by the communications device and information about maximum receive data transmission bandwidth supported by the communications device.

In the embodiments of the present disclosure, the communications device determines the information about the maximum data transmission bandwidth supported by the communications device and sends the information about the maximum data transmission bandwidth supported by the communications device, so that communications devices supporting different maximum data transmission bandwidth can coexist in a communications system, to implement communication between communications devices supporting different maximum data transmission bandwidth.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. In addition, the term "include", "have", or any other variant thereof is intended to cover a non-exclusive inclusion. For example, a process, a method, a system, a product, or a device that includes a series of operations or modules is not necessarily limited to the operations or modules that are expressly listed, but may include another operation or module not expressly listed or inherent to the process, the method, the product, or the device. The module division in this specification is merely logical division, and there may be other division during implementation in actual application. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another form, and this is not limited in this specification. In addition, modules or sub-modules described as separate components may be or may not be physically separated, or may be or may not be physical modules, or may be distributed to a plurality of circuit modules. Objectives of the solutions of the embodiments of the present disclosure may be implemented by selecting some or all of the modules according to actual requirements.

The embodiments of the present disclosure provide a method and device for sending capability information of a communications device, to implement communication between communications devices. The communications device includes a terminal device or a network device.

Figure 1:
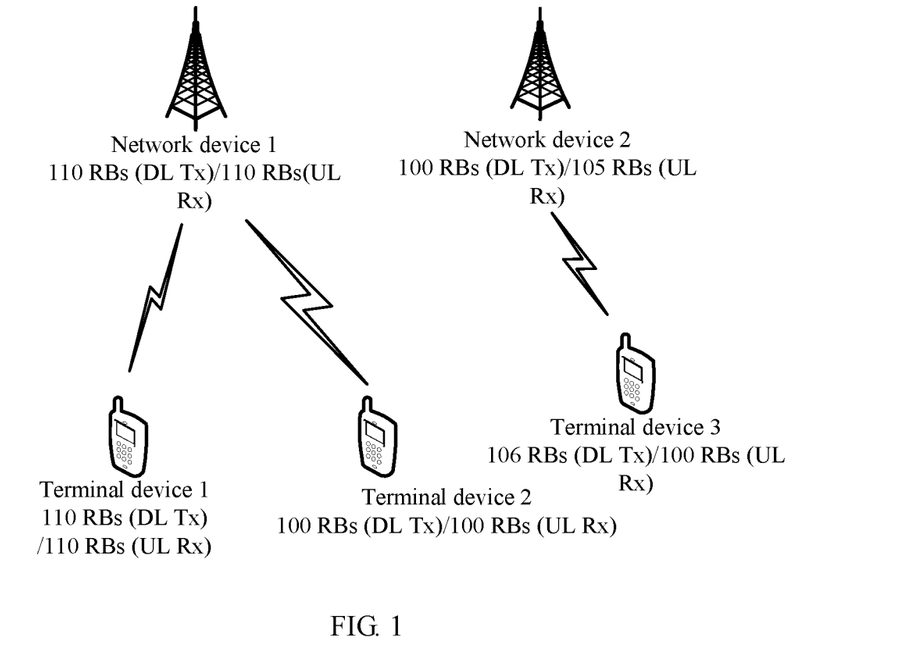
FIG. 1 is a schematic diagram of a communications system according to an embodiment of the present disclosure.

FIG. 1 is a communications system applicable to the embodiments of the present disclosure.

It should be noted that the communications system mentioned in the embodiments of the disclosure includes but is not limited to: a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and a next-generation 5G mobile communications system.

A network device in the embodiments of the present disclosure may be a device configured to communicate with a terminal device, and the network device may include a base station. The base station includes but is not limited to: an evolved NodeB (eNB), a radio network controller (RNC), a NodeB (NB), a base station controller (BSC), a base transceiver station (BTS), a home base station (for example, Home evolved NodeB or Home NodeB, HNB), a baseband unit (BBU), a next-generation new radio (NR) base station (for example, a gNB), or the like.

The terminal device mentioned in the present disclosure may be a device that provides a user with voice and/or data connectivity, a handheld device having a wireless connection function, or another processing device connected to a wireless modem. The terminal device may communicate with one or more core networks by using a radio access network (RAN). The terminal device may be a mobile terminal, such as a mobile phone (or referred to as a "cellular" phone) and a computer with a mobile terminal. For example, the terminal device may be a portable, pocket-sized, handheld, computer built-in, or in-vehicle mobile apparatus, which exchanges voice and/or data with the radio access network. For example, the terminal device may be a device such as a personal communications service (PCS) phone, a cordless phone, a session initiation protocol (SIP) phone, a wireless local loop (WLL) station, or a personal digital assistant (PDA). A wireless terminal may be referred to as a system, a subscriber unit), a subscriber station, a mobile station, a mobile console, a remote station, an access point, a remote terminal, an access terminal, a user terminal, a terminal device, a user agent, a user device, or user equipment.

Network devices 1 and 2 and terminal devices 1 to 3 in FIG. 1 are merely used as an example. The communications system shown in FIG. 1 may include one or more network devices, and may include one or more terminal devices. Communications devices included in the communications system shown in FIG. 1 may have different capabilities. For example, both an uplink data transmission capability and a downlink data transmission capability of the network device 1 are 110 resource blocks (RBs). A downlink data transmission capability of the network device 2 is 100 RBs and an uplink data transmission capability of the network device 2 is 105 RBs. Both an uplink data transmission capability and a downlink data transmission capability of the terminal device 1 are 110 RBs.

In the embodiments of the present disclosure, sending capability information of the communications device may include: reporting, by the terminal device, capability information of the terminal device to the network device, or broadcasting, by the network device, capability information of the network device.

The following briefly describes some concepts that may be mentioned in the embodiments of the present disclosure.

The capability information of the communications device may include: information about carrier bandwidth supported by the communications device, information about maximum data transmission bandwidth supported by the communications device, information about a waveform supported by the communications device, information about a physical layer parameter (namely, type information of numerology) supported by the communications device, or the like.

The waveform supported by the communications device includes a spectrum localization ofdm waveform, an ofdm waveform, or the like. The spectrum localization ofdm waveform includes an f-ofdm waveform or a w-ofdm waveform.

The physical layer parameter supported by the communications device may include at least one of parameters such as a subcarrier spacing, a CP length, a TTI length, a symbol length, and a quantity of symbols. If a correspondence between a set of physical layer parameters supported by the communications device and an index is specified in advance, the information about the physical layer parameter supported by the communications device may be index information of the set of physical layer parameters supported by the communications device, for example, type information of numerology.

Figure 2:
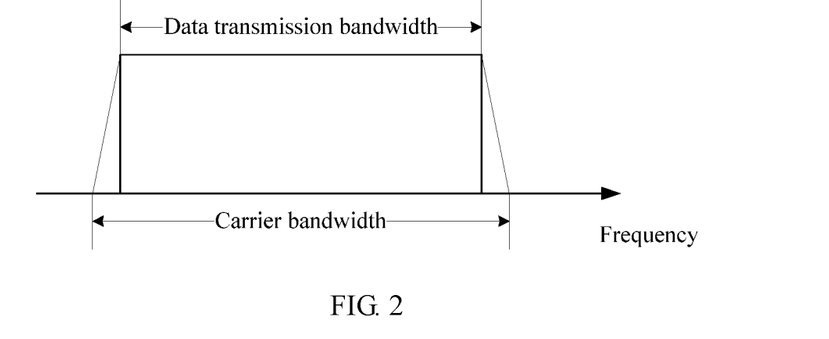
FIG. 2 is a schematic diagram of a spectrum utilization rate according to an embodiment of the present disclosure.

The carrier bandwidth is radio frequency operating bandwidth of the communications device. The carrier bandwidth may also be referred to as system bandwidth. Data transmission bandwidth is bandwidth that can be used for effective data transmission and that is in the carrier bandwidth. The data transmission bandwidth is less than the carrier bandwidth. For example, if the communications device uses the data transmission bandwidth to transmit data, an radio frequency (RF) performance requirement of the radio access network (RAN) Working Group 4 of the Third Generation Partnership Project (3GPP) standards organization may need to be satisfied. The RF performance requirement may include a spectrum template, an adjacent channel leakage power ratio (ACLR), an error vector magnitude (EVM), or the like. Bandwidth that is not used for data transmission and that is in the carrier bandwidth is referred to as a "guard band". A ratio of the data transmission bandwidth to the carrier bandwidth is referred to as a spectrum utilization rate. FIG. 2 is a schematic diagram of a spectrum utilization rate.

The data transmission bandwidth may include transmit data transmission bandwidth and receive data transmission bandwidth. The transmit data transmission bandwidth is data transmission bandwidth supported by the communications device when the communications device serves as a transmit device. The receive data transmission bandwidth is data transmission bandwidth supported by the communications device when the communications device serves as a receive device. The transmit data transmission bandwidth and the receive data transmission bandwidth of the communications device may be the same or different. The transmit data transmission bandwidth of the communications device may be related to a waveform or a physical layer parameter used by the communications device when the communications device sends data. The receive data transmission bandwidth of the communications device may be related to a parameter of a filter of a receiver that is used by the communications device when the communications device receives data. If the communications device is a network device, transmit data transmission bandwidth of the network device may be downlink data transmission bandwidth, and receive data transmission bandwidth of the network device may be uplink data transmission bandwidth. If the communications device is a terminal device, transmit data transmission bandwidth of the terminal device may be uplink data transmission bandwidth, and receive data transmission bandwidth of the terminal device may be downlink data transmission bandwidth.

The maximum data transmission bandwidth supported by the communications device includes maximum transmit data transmission bandwidth supported by the communications device and maximum receive data transmission bandwidth supported by the communications device. The maximum data transmission bandwidth supported by the communications device is related to the carrier bandwidth. In addition, the maximum data transmission bandwidth supported by the communications device may be further related to a physical layer parameter (namely, numerology) used by the communications device. For example, if the system bandwidth (carrier bandwidth) is 20 MHz, the subcarrier spacing is 15 KHz, and a CP overhead is 6.7%, a range of the maximum data transmission bandwidth supported by the communications device is effective bandwidth values from 18 MHz to 19.8 MHz. The maximum data transmission bandwidth supported by the communications device is a value in the range of the maximum data transmission bandwidth. Several values of the maximum data transmission bandwidth can be preset. The communications device can determine, based on the carrier bandwidth and/or the physical layer parameter used by the communications device, the maximum data transmission bandwidth supported by the communications device from the several preset values of the maximum data transmission bandwidth. A range of the maximum data transmission bandwidth may also be preset. The communications device can determine, based on the carrier bandwidth and/or the physical layer parameter used by the communications device, the maximum data transmission bandwidth supported by the communications device from the preset range of the maximum data transmission bandwidth.

The information about the maximum data transmission bandwidth supported by the communications device is used to indicate the maximum data transmission bandwidth supported by the communications device, and the maximum data transmission bandwidth supported by the communications device can be determined based on the information about the maximum data transmission bandwidth supported by the communications device. Sending the information about the maximum data transmission bandwidth supported by the communications device includes: sending information about the maximum transmit data transmission bandwidth supported by the communications device and information about the maximum receive data transmission bandwidth supported by the communications device. If the maximum transmit data transmission bandwidth supported by the communications device is the same as the maximum receive data transmission bandwidth supported by the communications device, the sending the information about the maximum data transmission bandwidth supported by the communications device includes: sending the information about the maximum transmit data transmission bandwidth supported by the communications device or the information about the maximum receive data transmission bandwidth supported by the communications device.

The information about the maximum data transmission bandwidth supported by the communications device may include the following information.

(1) Information About a Maximum Data Transmission Bandwidth Value Supported by the Communications Device Limited bits (bit) specified in a protocol may be used to indicate the information about the maximum data transmission bandwidth value supported by the communications device. The protocol may specify that n bits are used to transfer the information about the maximum data transmission bandwidth supported by the communications device, where n is a positive integer. Parameters of a bandwidth of 20 MHz, a subcarrier spacing of 15 KHz, and a CP overhead of 6.7% are used as an example, and if the protocol specifies that 2 bits are used to transfer the information about the maximum data transmission bandwidth supported by the communications device, maximum data transmission bandwidth values supported by the communications device may be four values, for example, 18 MHz, 18.72 MHz, 19.44 MHz, and 19.98 MHz. 00 indicates that the maximum data transmission bandwidth supported by the communications device is 18 MHz, 01 indicates that the maximum data transmission bandwidth supported by the communications device is 18.72 MHz, 10 indicates that the maximum data transmission bandwidth supported by the communications device is 19.44 MHz, and 11 indicates that the maximum data transmission bandwidth supported by the communications device is 19.98 MHz. If the protocol specifies that 1 bit is used to transfer the information about the maximum data transmission bandwidth supported by the communications device, supported maximum data transmission bandwidth values may be two values, for example, 19.44 MHz and 18.72 MHz. 0 indicates that the maximum data transmission bandwidth supported by the communications device is 18.72 MHz and 1 indicates that the maximum data transmission bandwidth supported by the communications device is 19.44 MHz. The protocol may alternatively specify that another quantity of bits, for example, 3 bits, are used to transfer the information about the maximum data transmission bandwidth supported by the communications device.

In one embodiment, if a correspondence between the maximum data transmission bandwidth value and an index is preset, the information about the maximum data transmission bandwidth supported by the communications device is index information corresponding to the maximum data transmission bandwidth supported by the communications device. The sending the maximum data transmission bandwidth supported by the communications device includes:

sending the index information corresponding to the maximum data transmission bandwidth supported by the communications device. For example, a table of the preset correspondence between the maximum data transmission bandwidth value and the index is as follows:

TABLE 1

Table of correspondences between maximum data transmission bandwidth values and indexes provided in the embodiments of the disclosure

| Transmission mode | Index |
| --- | --- |
| Maximum data transmission bandwidth value 1 | Index 1 |
| Maximum data transmission bandwidth value 2 | Index 2 |
| Maximum data transmission bandwidth value 3 | Index 3 |
| Maximum data transmission bandwidth value 4 | Index 4 |
| ... | ... |

In one embodiment, the network device can quantize the maximum data transmission bandwidth value supported by the communications device into a quantized value by using a quantization method. The information about the maximum data transmission bandwidth supported by the communications device is information about the quantized value. The sending the maximum data transmission bandwidth supported by the communications device includes: sending the information about the quantized value of the maximum data transmission bandwidth supported by the communications device.

(2) Information About a Maximum Spectrum Utilization Rate Supported by the Communications Device The maximum spectrum utilization rate is a ratio of the maximum data transmission bandwidth supported by the communications device to the carrier bandwidth. The maximum data transmission bandwidth supported by the communications device can be determined based on the maximum spectrum utilization rate supported by the communications device and the carrier bandwidth. Limited bits specified in a protocol can be used to represent the information about the maximum spectrum utilization rate supported by the communications device. The protocol may specify that n bits are used to transfer the information about the maximum spectrum utilization rate supported by the communications device, where n is a positive integer. Parameters of a bandwidth of 20 MHz, a subcarrier spacing of 15 KHz, and a CP overhead of 6.7% are used as an example. It is assumed that a range of the maximum spectrum utilization rate supported by the communications device is 90% to 99%. If the protocol specifies that 2 bits are used to transfer the information about the maximum spectrum utilization rate supported by the communications device, maximum spectrum utilization rates supported by the communications device may be four values, for example, 90%, 93%, 97%, and 99%. 00 indicates that the maximum spectrum utilization rate supported by the communications device is 90% (that is, the maximum data transmission bandwidth supported by the communications device is about 18 MHz), 01 indicates that the maximum spectrum utilization rate supported by the communications device is 93% (that is, the maximum data transmission bandwidth supported by the communications device is about 18.72 MHz), 10 indicates that the maximum spectrum utilization rate supported by the communications device is 97% (that is, the maximum data transmission bandwidth supported by the communications device is about 19.44 MHz), and 11 indicates that the maximum spectrum utilization rate supported by the communications device is 99% (that is, the maximum data transmission bandwidth supported by the communications device is about 19.98 MHz). If the protocol specifies that 1 bit is used to transfer the information about the maximum spectrum utilization rate supported by the communications device, maximum spectrum utilization rate values supported by the communications device may be two values, for example, 90% and 93%. 0 indicates that the maximum spectrum utilization rate supported by the communications device is 90%, and 1 indicates that the maximum spectrum utilization rate supported by the communications device is 93%. The protocol may alternatively specify that another quantity of bits, for example, 3 bits, are used to transfer the information about the maximum spectrum utilization rate supported by the communications device.

(3) Information About a Quantity of Resource Blocks (RB Corresponding to the Maximum Data Transmission Bandwidth Supported by the Communications Device If the subcarrier spacing and the quantity of RBs are certain, the data transmission bandwidth is certain. The maximum data transmission bandwidth supported by the communications device can be determined based on the subcarrier spacing and the quantity of RBs corresponding to the maximum data transmission bandwidth supported by the communications device. It is generally considered that one RB includes L symbols and K subcarriers, where L and K are positive integers greater than 1. The maximum data transmission bandwidth value supported by the communications device is a product of the quantity of RBs corresponding to the maximum data transmission bandwidth supported by the communications device, a quantity of subcarriers included in one RB, and the subcarrier spacing. Limited bits specified in a protocol can be used to represent the information about the quantity of RBs corresponding to the maximum data transmission bandwidth supported by the communications device. The protocol may specify that n bits are used to transfer the information about the quantity of RBs corresponding to the maximum data transmission bandwidth supported by the communications device, where n is a positive integer. Parameters of a bandwidth of 20 MHz, a subcarrier spacing of 15 KHz, and a CP overhead of 6.7% are used as an example. It is assumed that a range of the quantity of RBs corresponding to the maximum data transmission bandwidth supported by the communications device is 100 RBs to 110 RBs. If the protocol specifies that 2 bits are used to transfer the information about the quantity of RBs corresponding to the maximum data transmission bandwidth supported by the communications device, the quantity of RBs corresponding to the maximum data transmission bandwidth supported by the communications device may have four values, for example, 110, 104, 97, and 99. For example, 00 indicates that the quantity of RBs corresponding to the maximum data transmission bandwidth supported by the communications device is 110 RBs, 01 indicates that the quantity of RBs corresponding to the maximum data transmission bandwidth supported by the communications device is 104 RBs (the 104 RBs correspond to 18.72-MHz data transmission bandwidth in the 20-MHz carrier bandwidth), 10 indicates that the quantity of RBs corresponding to the maximum data transmission bandwidth supported by the communications device is 97 RBs (the 97 RBs correspond to 19.44-MHz data transmission bandwidth in the 20-MHz carrier bandwidth), and 11 indicates that the quantity of RBs corresponding to the maximum data transmission bandwidth supported by the communications device is 99 RBs (the 99 RBs correspond to 19.98-MHz data transmission bandwidth in the 20-MHz carrier bandwidth). If the protocol specifies that 1 bit is used to transfer the information about the quantity of RBs corresponding to the maximum data transmission bandwidth supported by the communications device, the quantity of RBs corresponding to the maximum data transmission bandwidth supported by the communications device may have two values, for example, 110 and 104. 0 indicates that the quantity of RBs corresponding to the maximum data transmission bandwidth supported by the communications device is 110 RBs, and 1 indicates that the quantity of RBs corresponding to the maximum data transmission bandwidth supported by the communications device is 104 RBs. The protocol may alternatively specify that another quantity of bits, for example, 3 bits, are used to transfer the information about the quantity of RBs corresponding to the maximum data transmission bandwidth supported by the communications device.

(4) Information About a Physical Layer Parameter Used by the Communications Device There is a correspondence between the information about the physical layer parameter (for example, type information of the numerology) and the information about the maximum data transmission bandwidth value, and the correspondence can be preset. The maximum data transmission bandwidth of the communications device can be determined based on the information about the physical layer parameter and the correspondence between the information about the physical layer parameter and the information about the maximum data transmission bandwidth value.

Alternatively, there is a correspondence between the information about the physical layer parameter and the information about the maximum spectrum utilization rate, and the correspondence can be preset. The maximum spectrum utilization rate of the communications device can be determined based on the information about the physical layer parameter and the correspondence between the information about the physical layer parameter and the information about the maximum spectrum utilization rate. The maximum data transmission bandwidth of the communications device can be determined based on the determined maximum spectrum utilization rate of the communications device.

Alternatively, there is a correspondence between the information about the physical layer parameter and the information about the quantity of RBs corresponding to the maximum data transmission bandwidth, and the correspondence can be preset. The information about the quantity of RBs corresponding to the maximum data transmission bandwidth of the communications device can be determined based on the information about the physical layer parameter and the correspondence between the information about the physical layer parameter and the information about the quantity of RBs corresponding to the maximum data transmission bandwidth. The maximum data transmission bandwidth of the communications device can be determined based on the determined information about the quantity of RBs corresponding to the maximum data transmission bandwidth of the communications device.

(5) Type Information of the Communications Device

There is a correspondence between the type information of the communications device and the information about the maximum data transmission bandwidth value, and the correspondence can be preset. The maximum data transmission bandwidth of the communications device can be determined based on the type information of the communications device and the correspondence between the type information of the communications device and the information about the maximum data transmission bandwidth value.

Alternatively, there is a correspondence between the type information of the communications device and the information about the maximum spectrum utilization rate, and the correspondence can be preset. The information about the maximum spectrum utilization rate of the communications device can be determined based on the type information of the communications device and the correspondence between the type information of the communications device and the information about the maximum spectrum utilization rate. The maximum data transmission bandwidth of the communications device can be determined based on the determined information about the maximum spectrum utilization rate of the communications device.

Alternatively, there is a correspondence between the type information of the communications device and the information about the quantity of RBs corresponding to the maximum data transmission bandwidth, and the correspondence can be preset. The information about the quantity of RBs corresponding to the maximum data transmission bandwidth of the communications device can be determined based on the type information of the communications device and the correspondence between the type information of the communications device and the information about the quantity of RBs corresponding to the maximum data transmission bandwidth. The maximum data transmission bandwidth of the communications device can be determined based on the determined information about the quantity of RBs corresponding to the maximum data transmission bandwidth of the communications device.

Further, a correspondence between the type information of the communications device and the information about the physical layer parameter may be alternatively preset, and the information about the physical layer parameter supported by the communications device can be determined based on the type information of the communications device.

Figure 3:
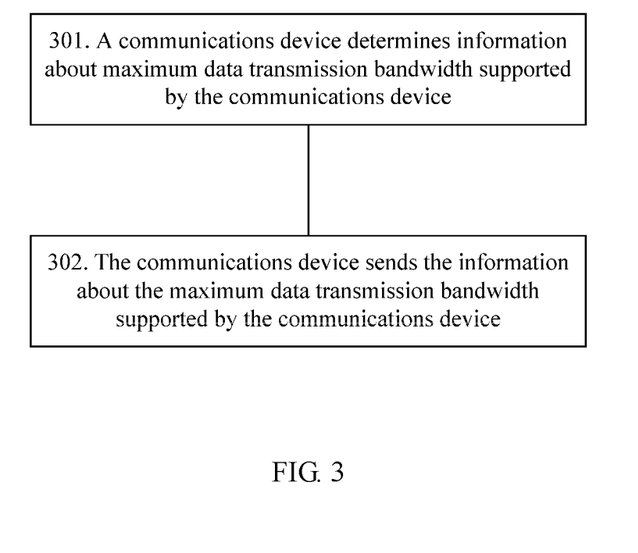
FIG. 3 is a schematic flowchart of a method for sending capability information of a communications device according to an embodiment of the present disclosure.

As shown in FIG. 3, a method for sending capability information of a communications device provided in an embodiment of the present disclosure may include the following operations.

Operation 301: A communications device determines information about maximum data transmission bandwidth supported by the communications device.

The communications device includes a terminal device or a network device. In one embodiment, the information about the maximum data transmission bandwidth supported by the communications device includes: information about maximum transmit data transmission bandwidth supported by the communications device and/or information about maximum receive data transmission bandwidth supported by the communications device.

For the information about the maximum data transmission bandwidth supported by the communications device, refer to the foregoing descriptions. Details are not described herein again.

Operation 302: The communications device sends the information about the maximum data transmission bandwidth supported by the communications device.

In one embodiment, if the maximum transmit data transmission bandwidth supported by the communications device is the same as the maximum receive data transmission bandwidth supported by the communications device, the sending, by the communications device, the information about the maximum data transmission bandwidth supported by the communications device includes: sending, by the communications device, the information about the maximum transmit data transmission bandwidth supported by the communications device or the information about the maximum receive data transmission bandwidth supported by the communications device.

In one embodiment, the method further includes: determining, by the communications device, information about a waveform supported by the communications device or information about a physical layer parameter supported by the communications device; and sending, by the communications device, the information about the waveform supported by the communications device or the information about the physical layer parameter supported by the communications device.

In this embodiment of the present disclosure, the communications device determines the information about the maximum data transmission bandwidth supported by the communications device and sends the information about the maximum data transmission bandwidth supported by the communications device, so that communications devices supporting different maximum data transmission bandwidth can coexist in a communications system, to implement communication between communications devices supporting different maximum data transmission bandwidth.

Figure 4:
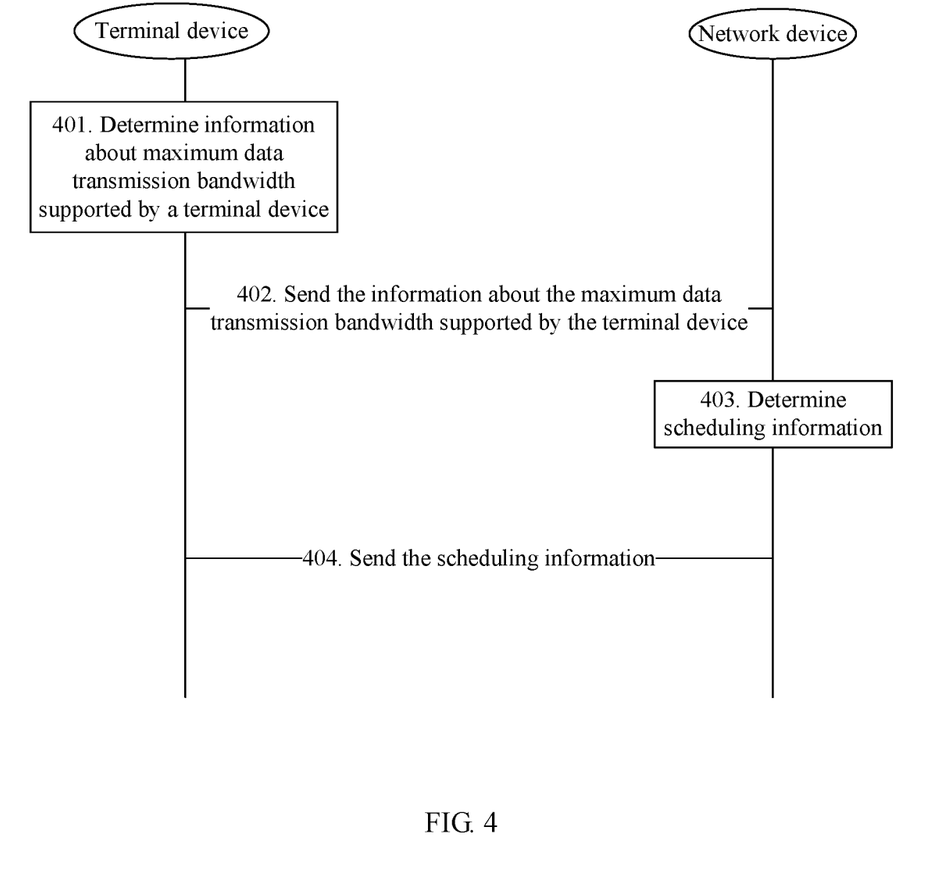
FIG. 4 is a schematic flowchart of a method for sending capability information of a terminal device according to an embodiment of the present disclosure.

If the communications device is a terminal device, as shown in FIG. 4, a method for sending capability information of a terminal device provided in an embodiment of the present disclosure may include the following operations.

Operation 401: The terminal device determines information about maximum data transmission bandwidth supported by the terminal device.

The terminal device may report the information about the maximum data transmission bandwidth supported by the terminal device each time the terminal device accesses a network. The information about the maximum data transmission bandwidth supported by the terminal device can be carried in a capability message of the terminal device for reporting. For example, the information about the maximum data transmission bandwidth supported by the terminal device is carried in a UE capability message for reporting.

For the information about the maximum data transmission bandwidth supported by the terminal device, refer to the foregoing descriptions. Details are not described herein again.

In one embodiment, the method further includes: determining, by the terminal device, information about a waveform supported by the terminal device or information about a physical layer parameter supported by the terminal device.

Operation 402: The terminal device sends the information about the maximum data transmission bandwidth supported by the terminal device to a network device.

In one embodiment, the method further includes: sending, by the terminal device, the information about the waveform supported by the terminal device or the information about the physical layer parameter supported by the terminal device to the network device.

Operation 403: The network device receives the information, sent by the terminal device, about the maximum data transmission bandwidth supported by the terminal device, and determines scheduling information of the terminal device based on the information about the maximum data transmission bandwidth supported by the terminal device.

If the network device further receives the information, sent by the terminal device, about the waveform supported by the terminal device or about the physical layer parameter supported by the terminal device, the determining, by the network device, scheduling information of the terminal device based on the information about the maximum data transmission bandwidth supported by the terminal device includes: determining, by the network device, the scheduling information of the terminal device based on the information about the maximum data transmission bandwidth supported by the terminal device, and the information about the waveform supported by the terminal device or the information about the physical layer parameter supported by the terminal device.

Operation 404: The network device sends the determined scheduling information to the terminal device.

The terminal device performs communication based on the received scheduling information.

Figure 5:
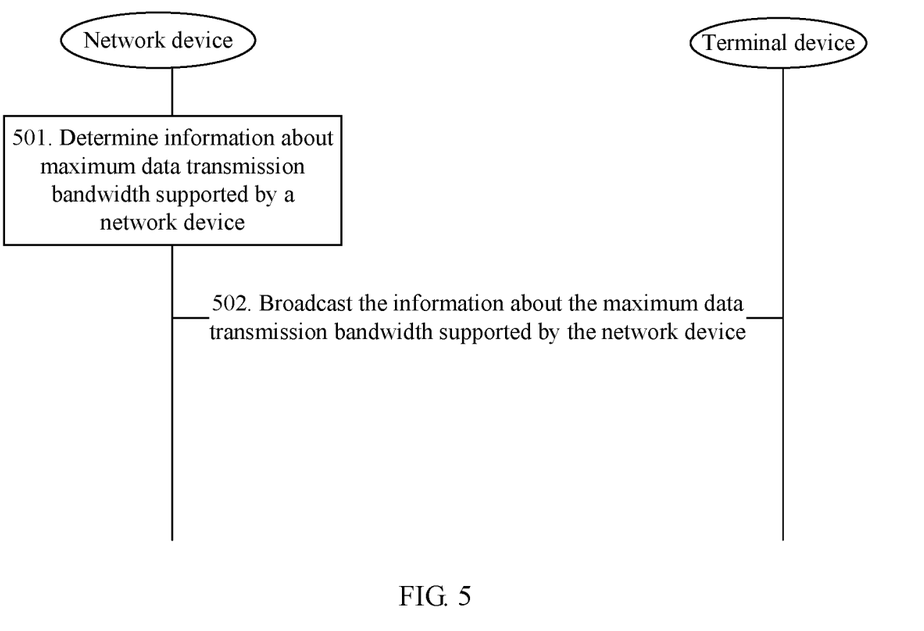
FIG. 5 is a schematic flowchart of a method for sending capability information of a network device according to an embodiment of the present disclosure.

If the communications device is a network device, as shown in FIG. 5, a method for sending capability information of a network device provided in an embodiment of the present disclosure may include the following operations.

Operation 501: The network device determines information about maximum data transmission bandwidth supported by the network device.

For the information about the maximum data transmission bandwidth supported by the network device, refer to the foregoing descriptions. Details are not described herein again.

In one embodiment, the method further includes: determining, by the network device, information about a waveform supported by the network device or information about a physical layer parameter supported by the network device.

Operation 502: The network device broadcasts the information about the maximum data transmission bandwidth supported by the network device.

In one embodiment, the method further includes: broadcasting, by the network device, the information about the waveform supported by the network device or the information about the physical layer parameter supported by the network device.

The network device may add the information about the maximum data transmission bandwidth supported by the network device, and the information about the waveform supported by the network device or the information about the physical layer parameter supported by the network device to a system message for broadcasting.

A terminal device receives the system message broadcast by the network device, obtains the information about the maximum data transmission bandwidth supported by the network device, and the information about the waveform supported by the network device or the information about the physical layer parameter supported by the network device, and communicates with the network device based on the information about the maximum data transmission bandwidth supported by the network device, and the information about the waveform supported by the network device or the information about the physical layer parameter supported by the network device.

A method processing process provided in the embodiments of the present disclosure can be implemented by using a software program, where the software program can be stored in a storage medium. When the stored software program is invoked, the foregoing operations of the methods are performed.

Based on a same inventive concept, an embodiment of the present disclosure further provides a communications device. A principle for resolving a problem by the device is similar to the foregoing method. Therefore, for implementation of the device, refer to the related descriptions in the foregoing method embodiments. No repeated description is provided.

Figure 6:
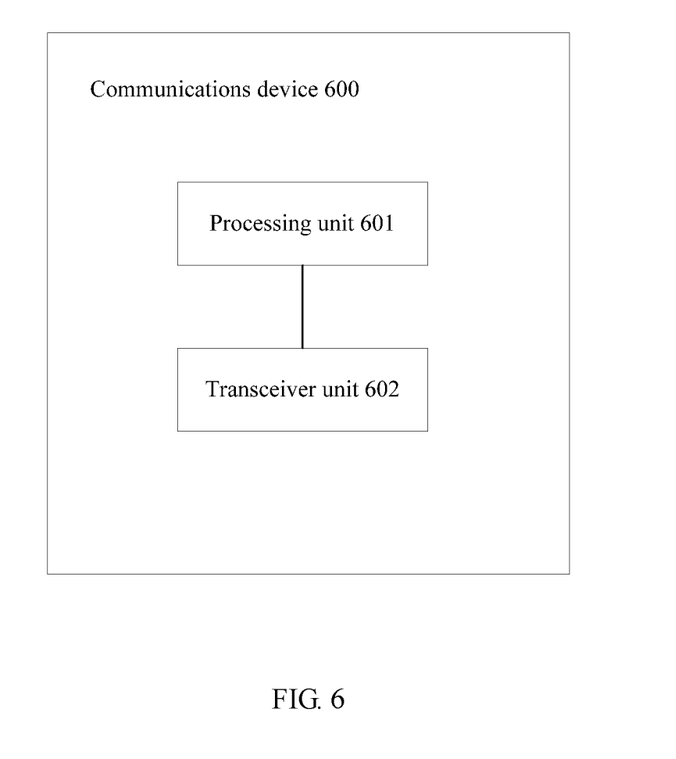
FIG. 6 is a schematic structural diagram of a communications device according to an embodiment of the present disclosure.

FIG. 6 is a schematic structural diagram of a communications device according to an embodiment of the present disclosure. The communications device 600 includes:

a processing unit 601, configured to determine information about maximum data transmission bandwidth supported by the communications device; and a transceiver unit 602, configured to send the information about the maximum data transmission bandwidth supported by the communications device.

For the information about the maximum data transmission bandwidth supported by the communications device, refer to the foregoing descriptions. Details are not described herein again.

In one embodiment, if maximum transmit data transmission bandwidth supported by the communications device is the same as maximum receive data transmission bandwidth supported by the communications device, the transceiver unit is configured to send information about the maximum transmit data transmission bandwidth supported by the communications device or information about the maximum receive data transmission bandwidth supported by the communications device.

In one embodiment, the processing unit is further configured to determine information about a waveform supported by the communications device or information about a physical layer parameter supported by the communications device; and the transceiver unit is further configured to send the information about the waveform supported by the communications device or the information about the physical layer parameter supported by the communications device.

If the communications device is a terminal device, the transceiver unit is configured to send information about maximum data transmission bandwidth supported by the terminal device to a network device; and the transceiver unit is further configured to receive scheduling information sent by the network device, where the scheduling information is determined by the network device based on the information about the maximum data transmission bandwidth supported by the terminal device.

If the communications device is a network device, the transceiver unit is configured to broadcast information about maximum data transmission bandwidth supported by the network device.

Functions of the processing unit can be implemented by using a processor. Functions of the transceiver unit can be implemented by using a transceiver.

Figure 7:
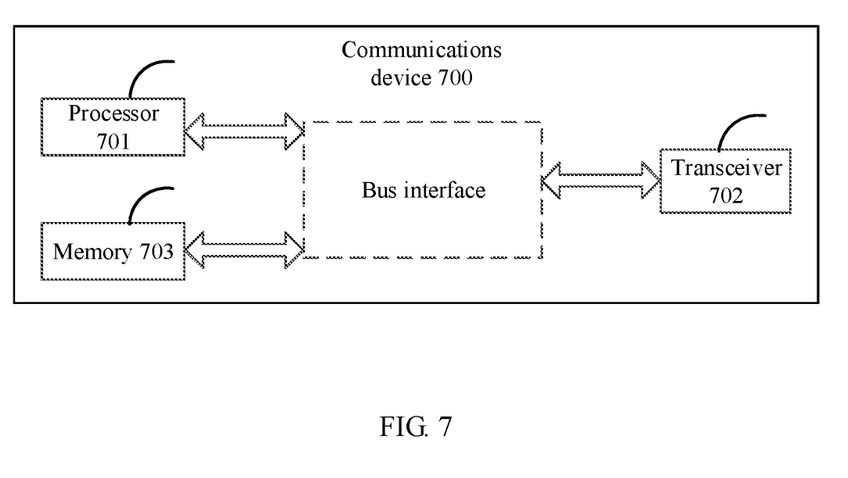
FIG. 7 is a schematic structural diagram of another communications device according to an embodiment of the present disclosure.

FIG. 7 is a schematic structural diagram of another communications device according to an embodiment of the present disclosure. The communications device includes a transceiver 702, a processor 701, and a memory 703.

The processor 701 reads a program in the memory 703 to control the transceiver 702, and the following process is performed:

determining, by the processor 701, information about maximum data transmission bandwidth supported by the communications device; and sending, by the transceiver 702, the information about the maximum data transmission bandwidth supported by the communications device.

In FIG. 7, a bus architecture may include any quantity of interconnected buses and bridges. Specifically, various circuits of one or more processors represented by the processor 701 and a memory represented by the memory 703 are connected. The bus architecture may further connect various other circuits such as a peripheral device, a voltage stabi-lizer, and a power management circuit. These are well known in the art, and therefore are not further described in this specification. A bus interface provides an interface. The transceiver 702 may be one or more elements, for example, a plurality of receivers and transmitters that provide units configured to communicate with various other apparatuses on a transmission medium. The processor 701 is responsible for managing the bus architecture and general processing, and may further provide various functions including timing, peripheral interfacing, voltage regulation, power management, and another control function. The memory 703 may store data that is used when the processor 701 performs an operation.

In one embodiment, the processor 701 may be a central processing unit (CPU), an application-specific integrated circuit (ASIC), a field-programmable gate array (FPGA), or a complex programmable logic device (CPLD).

In this embodiment of the present disclosure, the processor 701 reads a program in the memory 703 to control the transceiver 702. For details about the executed processing, refer to related descriptions of the processing unit and the transceiver unit in the embodiment shown in FIG. 6. Details are not described herein again.

According to another aspect of the disclosure, a computer readable storage medium is provided. The computer readable storage medium stores an instruction, and when the instruction is run on a computer, the computer performs the method according to the foregoing aspects.

According to still another aspect of the disclosure, a computer program product including an instruction is provided, and when the computer program product is run on a computer, the computer performs the method according to the foregoing aspects.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center that are integrated by using one or more available media. The available medium may be a magnetic medium (for example, a floppy disk, a hard disk, or a magnetic tape), an optical medium (for example, DVD), a semiconductor medium (for example, a Solid State Disk (SSD)), or the like.

In conclusion, the foregoing descriptions are merely examples of embodiments of the present disclosure, but are not intended to limit the protection scope of the present disclosure. Any modification, equivalent replacement, improvement, or the like made without departing from the spirit and principle of the present disclosure shall fall within the protection scope of the present disclosure.

What is claimed is:

1. A method for sending capability information of a communications device, comprising:
   determining, by a communications device, information about maximum data transmission bandwidth supported by the communications device, wherein the information about the maximum data transmission bandwidth includes a maximum data transmission bandwidth value, which is an integer representing a number of bits in a communication protocol, the number of bits used to transfer the information about the maximum data transmission bandwidth; and
   sending, by the communications device, the information about the maximum data transmission bandwidth supported by the communications device.

2. The method according to claim 1, wherein the information about the maximum data transmission bandwidth supported by the communications device further comprises at least one of the following information:
   information about a maximum spectrum utilization rate supported by the communications device, wherein the information about the maximum spectrum utilization rate supported by the communications device is a ratio of the maximum data transmission bandwidth supported by the communications device to carrier bandwidth;
   information about a quantity of resource blocks (RBs) corresponding to the maximum data transmission bandwidth supported by the communications device;
   information about a physical layer parameter used by the communications device, wherein there is a correspondence between the information about the physical layer parameter used by the communications device and the information about the maximum data transmission bandwidth value supported by the communications device, or there is a correspondence between the information about the physical layer parameter used by the communications device and the information about the maximum spectrum utilization rate supported by the communications device, or there is a correspondence between the information about the physical layer parameter used by the communications device and the information about the quantity of RBs corresponding to the maximum data transmission bandwidth supported by the communications device; or
   type information of the communications device, wherein there is a correspondence between the type information of the communications device and the information about the maximum data transmission bandwidth value supported by the communications device, or there is a correspondence between the type information of the communications device and the information about the maximum spectrum utilization rate supported by the communications device, or there is a correspondence between the type information of the communications device and the information about the quantity of RBs corresponding to the maximum data transmission bandwidth supported by the communications device.

3. The method according to claim 1, wherein the information about the maximum data transmission bandwidth supported by the communications device comprises: information about maximum transmit data transmission bandwidth supported by the communications device and information about maximum receive data transmission bandwidth supported by the communications device.

4. The method according to claim 1, wherein when the maximum transmit data transmission bandwidth supported by the communications device is the same as maximum receive data transmission bandwidth supported by the communications device, wherein the sending, by the communications device, the information about the maximum data transmission bandwidth supported by the communications device comprises:
   sending, by the communications device, the information about the maximum transmit data transmission bandwidth supported by the communications device or the information about the maximum receive data transmission bandwidth supported by the communications device.

5. The method according to claim 1, further comprising:
   determining, by the communications device, information about a waveform supported by the communications device or information about a physical layer parameter supported by the communications device; and
   sending, by the communications device, the information about the waveform supported by the communications device or the information about the physical layer parameter supported by the communications device.

6. The method according to claim 1, wherein when the communications device comprises a terminal device, the sending, by the communications device, the information about the maximum data transmission bandwidth supported by the communications device comprises: sending, by the terminal device, information about maximum data transmission bandwidth supported by the terminal device to a network device; and
   the method further comprises: receiving, by the terminal device, scheduling information sent by the network device, wherein the scheduling information is determined by the network device based on the information about the maximum data transmission bandwidth supported by the terminal device.

7. The method according to claim 1, wherein when the communications device comprises a network device, the sending, by the communications device, the information about the maximum data transmission bandwidth supported by the communications device comprises: broadcasting, by the network device, information about maximum data transmission bandwidth supported by the network device.

8. A communications device, comprising:
   a transceiver;
   a processor; and
   a memory;
   wherein the processor is configured to read a program in the memory, wherein the program, when executed by the processor, causes the processor to control the transceiver, and to perform the following process:
      determining information about maximum data transmission bandwidth supported by the communications device, wherein the information about the maximum data transmission bandwidth includes a maximum data transmission bandwidth value, which is an integer representing a number of bits in a communication protocol, the number of bits used to transfer the information about the maximum data transmission bandwidth; and
      sending, by the transceiver, the information about the maximum data transmission bandwidth supported by the communications device.

9. The communications device according to claim 8, wherein the information about the maximum data transmission bandwidth supported by the communications device further comprises at least one of the following information:

information about a maximum spectrum utilization rate supported by the communications device, wherein the information about the maximum spectrum utilization rate supported by the communications device is a ratio of the maximum data transmission bandwidth supported by the communications device to carrier bandwidth;

information about a quantity of resource blocks (RBs) corresponding to the maximum data transmission bandwidth supported by the communications device;

information about a physical layer parameter used by the communications device, wherein there is a correspondence between the information about the physical layer parameter used by the communications device and the information about the maximum data transmission bandwidth value supported by the communications device, or there is a correspondence between the information about the physical layer parameter used by the communications device and the information about the maximum spectrum utilization rate supported by the communications device, or there is a correspondence between the information about the physical layer parameter used by the communications device and the information about the quantity of RBs corresponding to the maximum data transmission bandwidth supported by the communications device; or type information of the communications device, wherein there is a correspondence between the type information of the communications device and the information about the maximum data transmission bandwidth value supported by the communications device, or there is a correspondence between the type information of the communications device and the information about the maximum spectrum utilization rate supported by the communications device, or there is a correspondence between the type information of the communications device and the information about the quantity of RBs corresponding to the maximum data transmission bandwidth supported by the communications device.

10. The communications device according to claim 8, wherein the information about the maximum data transmission bandwidth supported by the communications device comprises: information about maximum transmit data transmission bandwidth supported by the communications device and information about maximum receive data transmission bandwidth supported by the communications device.

11. The communications device according to claim 8, wherein when the maximum transmit data transmission bandwidth supported by the communications device is the same as maximum receive data transmission bandwidth supported by the communications device, the transceiver unit is configured to send the information about the maximum transmit data transmission bandwidth supported by the communications device or the information about the maximum receive data transmission bandwidth supported by the communications device.

12. The communications device according to claim 8, wherein the processor is further configured to determine information about a waveform supported by the communications device or information about a physical layer parameter supported by the communications device; and the transceiver is further configured to send the information about the waveform supported by the communications device or the information about the physical layer parameter supported by the communications device.

13. The communications device according to claim 8, wherein when the communications device is a terminal device, the transceiver is configured to send information about maximum data transmission bandwidth supported by the terminal device to a network device; and the transceiver is further configured to receive scheduling information sent by the network device, wherein the scheduling information is determined by the network device based on the information about the maximum data transmission bandwidth supported by the terminal device.

14. The communications device according to claim 8, wherein when the communications device is a network device, the transceiver is configured to broadcast information about maximum data transmission bandwidth supported by the network device.

15. A non-transitory machine-readable medium having instructions stored therein for sending capability information of a communications device, wherein the instructions, when executed by a processor, cause the processor to perform operations comprising:

determining, by a communications device, information about maximum data transmission bandwidth supported by the communications device, wherein the information about the maximum data transmission bandwidth includes a maximum data transmission bandwidth value, which is an integer representing a number of bits in a communication protocol, the number of bits used to transfer the information about the maximum data transmission bandwidth; and sending, by the communications device, the information about the maximum data transmission bandwidth supported by the communications device.

16. The non-transitory machine-readable medium according to claim 15, wherein the information about the maximum data transmission bandwidth supported by the communications device further comprises at least one of the following information:

information about a maximum spectrum utilization rate supported by the communications device, wherein the information about the maximum spectrum utilization rate supported by the communications device is a ratio of the maximum data transmission bandwidth supported by the communications device to carrier bandwidth;

information about a quantity of resource blocks (RBs) corresponding to the maximum data transmission bandwidth supported by the communications device;

information about a physical layer parameter used by the communications device, wherein there is a correspondence between the information about the physical layer parameter used by the communications device and the information about the maximum data transmission bandwidth value supported by the communications device, or there is a correspondence between the information about the physical layer parameter used by the communications device and the information about the maximum spectrum utilization rate supported by the communications device, or there is a correspondence between the information about the physical layer parameter used by the communications device and the information about the quantity of RBs corresponding to the maximum data transmission bandwidth supported by the communications device; or type information of the communications device, wherein there is a correspondence between the type information of the communications device and the information about the maximum data transmission bandwidth value supported by the communications device, or there is a correspondence between the type information of the communications device and the information about the maximum spectrum utilization rate supported by the communications device, or there is a correspondence between the type information of the communications device and the information about the quantity of RBs corresponding to the maximum data transmission bandwidth supported by the communications device.

17. The non-transitory machine-readable medium according to claim 15, wherein the information about the maximum data transmission bandwidth supported by the communications device comprises: information about maximum transmit data transmission bandwidth supported by the communications device and information about maximum receive data transmission bandwidth supported by the communications device.

18. The non-transitory machine-readable medium according to claim 15, wherein when the maximum transmit data transmission bandwidth supported by the communications device is the same as maximum receive data transmission bandwidth supported by the communications device, the sending, by the communications device, the information about the maximum data transmission bandwidth supported by the communications device comprises: sending, by the communications device, the information about the maximum transmit data transmission bandwidth supported by the communications device or the information about the maximum receive data transmission bandwidth supported by the communications device.

19. The non-transitory machine-readable medium according to claim 15, wherein the operations further comprise:
  determining, by the communications device, information about a waveform supported by the communications device or information about a physical layer parameter supported by the communications device; and
  sending, by the communications device, the information about the waveform supported by the communications device or the information about the physical layer parameter supported by the communications device.

20. The non-transitory machine-readable medium according to claim 15, wherein when the communications device comprises a terminal device, the sending, by the communications device, the information about the maximum data transmission bandwidth supported by the communications device comprises: sending, by the terminal device, information about maximum data transmission bandwidth supported by the terminal device to a network device; and
  the method further comprises: receiving, by the terminal device, scheduling information sent by the network device, wherein the scheduling information is determined by the network device based on the information about the maximum data transmission bandwidth supported by the terminal device.

* * * * *